(12) United States Patent
Kichikawa et al.

(10) Patent No.: US 11,244,187 B2
(45) Date of Patent: Feb. 8, 2022

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventors: Tomohiro Kichikawa, Kanagawa (JP); Noriko Sakai, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 41 days.

(21) Appl. No.: 16/830,523

(22) Filed: Mar. 26, 2020

(65) Prior Publication Data

US 2021/0081696 A1     Mar. 18, 2021

(30) Foreign Application Priority Data

Sep. 17, 2019   (JP) .................................. 2019-168567

(51) Int. Cl.
*G06K 9/32*   (2006.01)
*G06T 7/11*   (2017.01)
*G06K 9/46*   (2006.01)

(52) U.S. Cl.
CPC ......... *G06K 9/3233* (2013.01); *G06K 9/4652* (2013.01); *G06T 7/11* (2017.01); *G06T 2207/10024* (2013.01)

(58) Field of Classification Search
CPC ...... G06K 9/3233; G06K 9/4652; G06K 9/56; G06T 7/11; G06T 2207/10024; G06T 7/254; H04N 5/23229; H04N 9/06
USPC .......................................................... 382/164
See application file for complete search history.

(56) References Cited

U.S. PATENT DOCUMENTS

| 7,831,086 | B2 | 11/2010 | Kondo et al. |
| 8,264,583 | B2 | 9/2012 | Yamaji et al. |
| 9,668,653 | B2* | 6/2017 | Qu ........................ A61B 5/0082 |
| 2015/0247846 | A1* | 9/2015 | Gerion ................. C12Q 1/6837 506/9 |
| 2016/0106329 | A1* | 4/2016 | Hoof ................... A61B 5/02416 600/479 |
| 2018/0070887 | A1* | 3/2018 | Lee ...................... A61B 5/0004 |
| 2019/0342491 | A1* | 11/2019 | Mandavilli ........ G06K 9/00228 |
| 2020/0064784 | A1* | 2/2020 | Steiner ................. G06K 9/3233 |
| 2020/0221956 | A1* | 7/2020 | Tzvieli .................. G01J 5/0025 |

FOREIGN PATENT DOCUMENTS

| JP | 2004-15106 A | 1/2004 |
| JP | 2004-228995 A | 8/2004 |
| JP | 2009-290249 A | 12/2009 |
| JP | 2010-62853 A | 3/2010 |

* cited by examiner

*Primary Examiner* — Ali Bayat
(74) *Attorney, Agent, or Firm* — Oliff PLC (57) ABSTRACT

An information processing apparatus includes a processor configured to: acquire an amount of color change, the amount of color change being an amount of color change caused by processing performed on image data, the amount of color change being acquired for each area with a color change within the image data; and extract an interest region from the image data, the interest region being an area in the image data where the amount of color change is greater than in other areas.

20 Claims, 8 Drawing Sheets

INFORMATION PROCESSING APPARATUS AND NON-TRANSITORY COMPUTER READABLE MEDIUM

CROSS-REFERENCE TO RELATED APPLICATIONS

This application is based on and claim priority under 35 USC 119 from Japanese Patent Application No. 2019-168567 filed Sep. 17, 2019.

BACKGROUND

(i) Technical Field

The present disclosure relates to an information processing apparatus, and a non-transitory computer readable medium

(ii) Related Art

Japanese Unexplained Patent Application Publication No. 2004-015106 discloses a data-entry-screen display method for an image processing apparatus. The image processing apparatus converts first image data into second image data, the first image data being image data of a predetermined subject captured from plural viewpoints, the second image data being image data of the subject as seen from the user's viewpoint. The image processing apparatus includes a setting unit, an image data conversion unit, an intermediate data processing unit, and an intermediate data conversion unit. The setting unit sets a viewpoint of the user at a predetermined position. The image data conversion unit converts the first image data into intermediate data. The intermediate data is image data that includes a pixel value corresponding to a light ray made incident from the subject onto a pixel constituting the first image data, and has a format that, for each direction of the light ray, enables acquisition of a pixel value corresponding to the light ray in the direction. Further, the intermediate data is image data in which a pixel value at the point of intersection between a light ray made incident from the subject onto a predetermined pixel constituting the first image data, and a plane passing a predetermined point and perpendicular to the light ray, is taken as the pixel value of the predetermined pixel. The intermediate data processing unit applies an interpolation process to the intermediate data. In the interpolation process, a pixel value at a point of intersection lying on another plane passing through the predetermined point and intersecting a light ray perpendicular to the other plane is used to interpolate a pixel value at a point on the plane passing through the predetermined point other than the point of intersection with the light ray. The intermediate data conversion unit converts the intermediate data into the second image data. In converting the intermediate data into the second image data, a pixel value in the intermediate data obtained after the interpolation process that corresponds to the light ray coinciding with a line connecting the user's viewpoint with each pixel on a first predetermined imaginary screen, is taken as the pixel value of a pixel on the first image nary screen, and image data including such a pixel value on the first image nary screen is taken as the second image data. The data-entry-screen display method includes using, for the interpolation performed in the interpolation process, a pixel value that has not been interpolated by the interpolation process, among pixel values at the point of intersection with the light ray perpendicular to the other plane.

Japanese Unexplained Patent Application Publication No. 2009-290249 discloses a trimming-rule learning apparatus. The trimming-rule learning apparatus includes a display that displays an image classified in advance for each object included in the image, an input unit that receives user's designation of a trimming region with respect to the displayed image, and a learning unit that, based on the composition of the trimming region obtained for each of plural images, learns a trimming rule for trimming an image on a user-by-user basis for each individual object. The learning unit extracts an object included in the trimming region. Based on the composition of the trimming region, the learning unit acquires composition information including the following pieces of information: the location of the object in an original image, which is the image before the trimming; the location of the object in the trimming region; the area ratio of the object to the original image; and the area ratio of the object to the trimming region. The learning unit learns the acquired composition information as the trimming rule.

Japanese Unexamined Patent Application Publication No. 2010-062853 discloses an information processing apparatus. The information processing apparatus includes a photographer information acquisition unit that acquires photographer information, the photographer information being information related to an action taken by a photographer before starting to shoot an image, and a processing determining unit that, based on the photographer information acquired by the photographer information acquisition unit, determines what kind of processing is to be applied to the image. The photographer information includes at least one of the following pieces of information: information indicating whether the photographer has checked the composition; information indicating whether the photographer has performed a preparatory operation for shooting: information indicating the location of an imaging apparatus; information indicating the time elapsed before the start of shooting; and information indicating the movement of the imaging apparatus before the start of shooting.

Techniques exist that determine an interest region, which is a region of interest in an image, by using information about the subject, the composition, and an action taken during shooting of the image.

However, for images to which a color correction has been applied, what natters as information is, for example, not the subject but how much color change has occurred.

SUMMARY

Aspects of non-limiting embodiments of the present disclosure relate to an information processing apparatus and a non-transitory computer readable medium with which when a color correction is applied to an image, an area in the image where a large color change has occurred can be identified as an interest region.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: acquire an amount of color change, the amount of color change being an amount of color change caused by processing performed on image data, the amount of color change being acquired for each area with a color change within the image data; and extract an interest region from the image data, the interest region being an area in the image data where the amount of color change is greater than in other areas.

BRIEF DESCRIPTION OF THE DRAWINGS

Exemplary embodiments of the present disclosure will be described in detail based on the following figures, wherein.

DETAILED DESCRIPTION

First Exemplary Embodiment

An exemplary embodiment of the present disclosure will be described bel ow in detail with reference to the drawings. The following description will be directed to an exemplary case in which an information processing apparatus 10 according to a first exemplary embodiment is a terminal such as a personal computer that manipulates and displays image data. However, this is not to be construed restrictively. The information processing apparatus 10 may be incorporated in a multi function machine having print, copy, scan, facsimile, and other functions, or may be incorporated in, for example, a server that receives or transmits image data, or stores image data.

Figure 1:
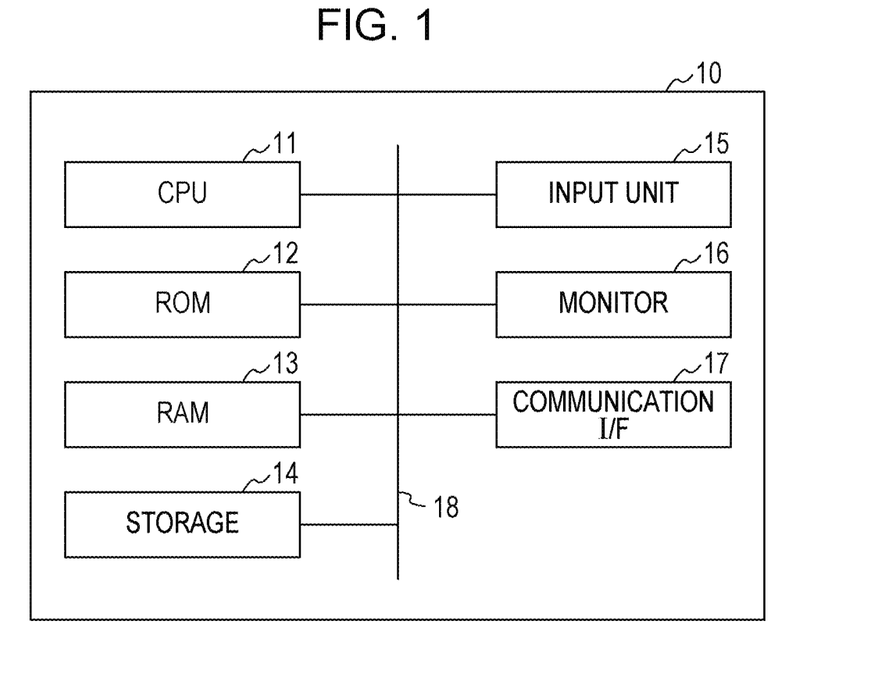
FIG. 1 is a block diagram illustrating an exemplary hardware configuration of an information processing apparatus according to exemplary embodiments.

FIG. 1 is a block diagram illustrating an exemplary hardware configuration of the information processing apparatus 10 according to the first exemplary embodiment. As illustrated in FIG. 1, the information processing apparatus 10 according to the first exemplary embodiment includes a central processing unit (CPU) 11, a read only memory (ROM 12, a random access memory (RAM 13, a storage 14, an input unit 15, a monitor 16, and a communication interface (communication I/F) 17. The CPU 11, the ROM 12, the RAM 13, the storage 14, the input unit 15, the monitor 16, and the communication I/F 17 are interconnected by a bus 18. The CPU 11 is an example of a processor.

The CPU 11 controls the entire information processing apparatus 10 in a centralized manner. The ROM 12 stores various programs including an information processing program) data, and other information that are used in the first exemplary embodiment. The RAM 13 is a memory used as a work area during execution of various program. The CPU 11 loads a program stored in the ROM 12 into the RAM 13, and executes the program to perform a process of extracting an interest region from image data. The storage 14 is, for example, a hard disk drive (HDD), a solid state drive (SSD), or a flash memory. The storage 14 may store an information processing program or other information. The input unit 15 is a keyboard or a mouse to receive an input of, for example, a character or a selection. The monitor 16 displays image data or other information. The communication I/F 17 transmits and receives data.

Figure 2:
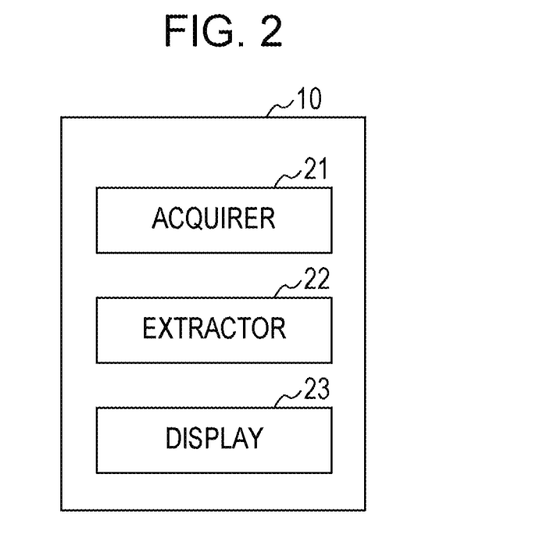
FIG. 2 is a block diagram illustrating an exemplary functional configuration of an information processing apparatus according to exemplary embodiments.

The functional configuration of the information processing apparatus 10 will be described below with reference to FIG. 2. FIG. 2 is a block diagram illustrating an exemplary functional configuration of the information processing apparatus 10 according to the first exemplary embodiment.

As illustrated in FIG. 2, the information processing apparatus 10 includes an acquirer 21, an extractor 22, and a display 23. As the CPU 11 executes the information processing program the CPU 11 functions as the acquirer 21, the extractor 22, and the display 23.

The acquirer 21 acquires the amount of change in color (to be referred to as "amount of color change" hereinafter) caused by processing performed on image data, for each area in the image data where a color change has occurred. More specifically, the acquirer 21 acquires the amount of color change by using pre-processing image data, which is image data before undergoing the processing, and post-processing image data, which is image data after undergoing the processing. Examples of the processing according to the first exemplary embodiment include manipulation of the color of image data, such as retouching, and correction of image data.

The extractor 22 extracts, from image data, an area with a greater amount of color change (to be referred to as "interest region" hereinafter) than in other areas.

If image data includes plural interest regions, the extractor 22 performs at least one of the following processes: extracting a single region enlarged to include these interest regions; and extracting plural regions each including an interest region. Further, the extractor 22 segments image data into segment regions, which are regions obtained by segmenting the image data equally or for each subject included in the image data. The extractor 22 extracts a segment region including an interest region. If an interest region is larger than a segment region, the extractor 22 enlarges the segment region such that the interest region is covered by the segment region, and extracts the enlarged segment region. In the foregoing description of the first exemplary embodiment, a region with a greater amount of color change than other areas is extracted as an interest region. However, this is not to be construed restrictively. The extractor 22 may extract a region with the greatest amount of color change as an interest region. In the foregoing description of the first exemplary embodiment, the amount of color change is determined by using pre-processing image data and post-processing image data. However, this is not to be construed restrictively. For example, if a look up table (to be referred to as "LUT" hereinafter) is used to covert a given color into another color, the amount of color change may be determined by using pre-processing image data or post-processing image data, and the conversion data of LUT.

The display 23 displays an acquired interest region. The display 23 also highlights or enlarges the display of an interest region, and displays information indicative of an area corresponding to the interest region.

Figure 3:
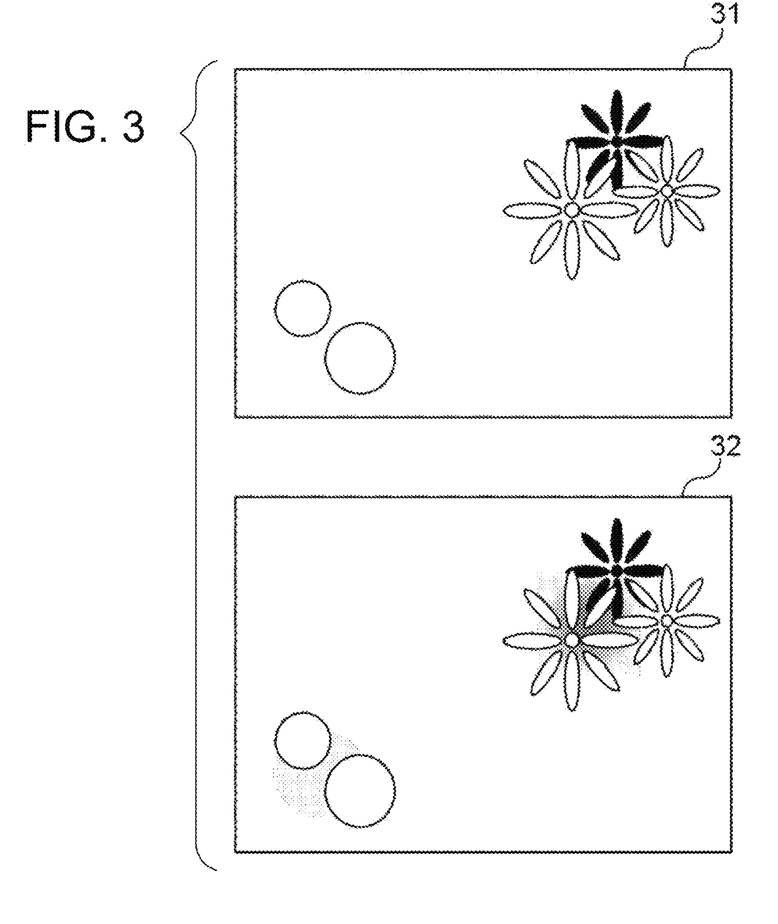
FIG. 3 is a schematic illustration of an example of image data before and after undergoing processing according to exemplary embodiments.
Figure 4:
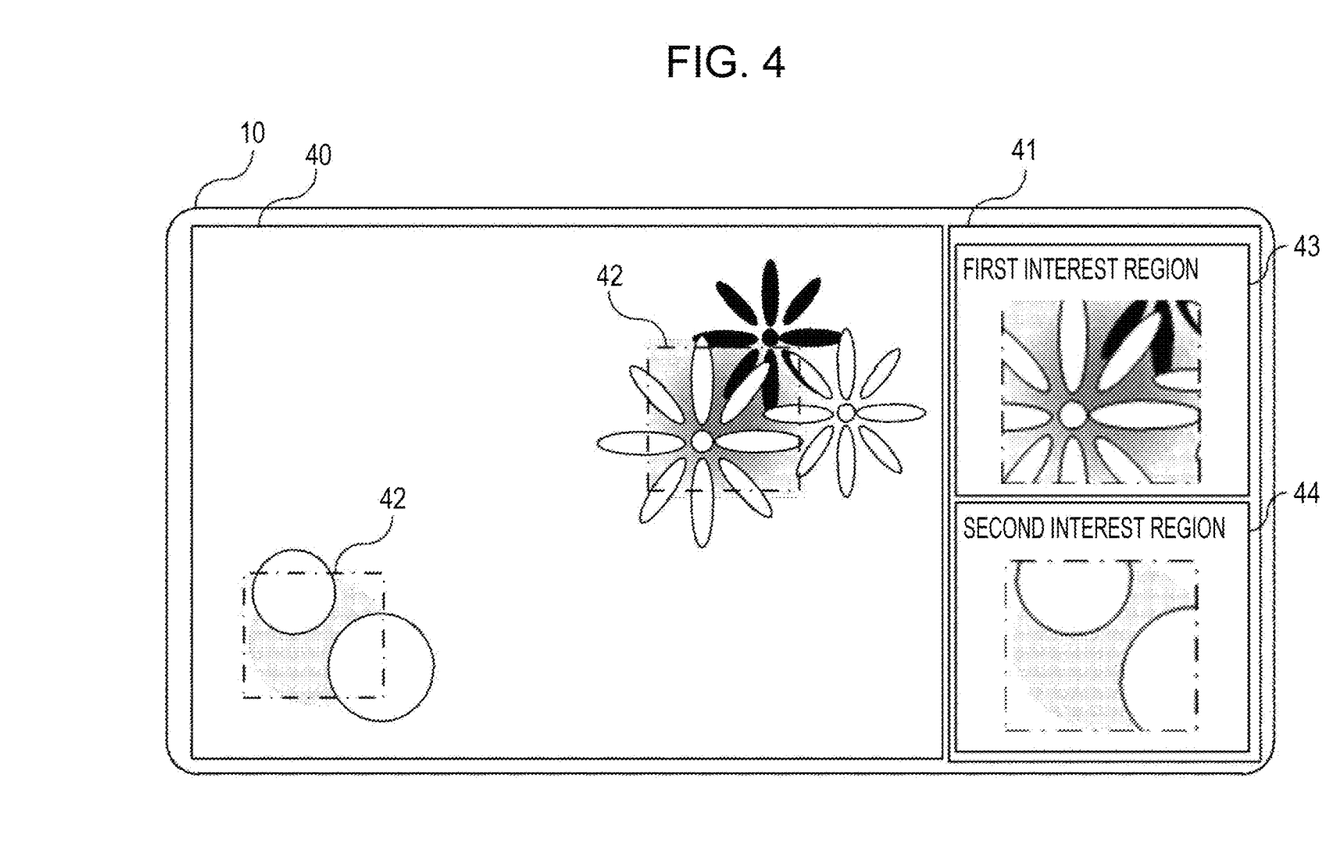
FIG. 4 is a schematic illustration of an example of screens displayed by an information processing apparatus, which is used to explain extraction of an interest region according to a first exemplary embodiment.
Figure 5:
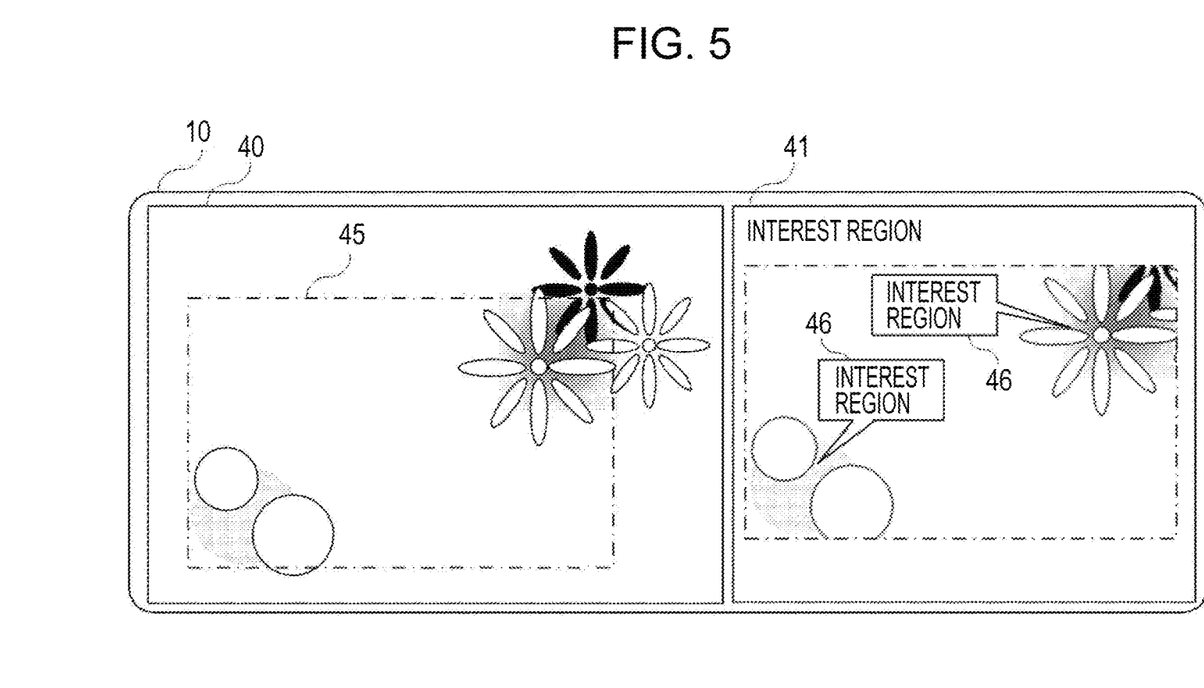
FIG. 5 is a schematic illustration of an example of screens displayed by an information processing apparatus, which is used to explain extraction of a single region including plural interest regions according to the first exemplary embodiment.

With reference to FIGS. 3 to 5, the following describes, before describing operation of the information processing apparatus 10, a method used by the information processing apparatus 10 to extract and display an interest region.

The general function of the information processing apparatus 10 will be described below with reference to FIG. 3. FIG. 3 is a schematic illustration of an example of image data before and after undergoing the processing according to the first exemplary embodiment.

For example, the upper drawing in FIG. 3 depicts pre-processing image data 31, which is image data before undergoing processing such as retouching, and the lower drawing in FIG. 3 depicts post-processing image data 32, which is image data after undergoing the processing such as retouching. For example, as illustrated in FIG. 3, the information processing apparatus 10 uses the pre-processing image data 31 and the post-processing image data 32 to extract a region of image data where a marked color change has occurred.

More specifically, the information processing apparatus 10 compares the pre-processing image data 31 with the post-processing image data 32 to calculate the amount of change in a color space, and extract an interest region through pixel-by-pixel comparisons. For example, by mapping the pixel values of the three primary colors of red, green, and blue respectively onto the x-, y-, and z-axes, all possible colors can be represented in a three-dimensional space by the composition of the three primary colors. A three-dimensional space with all possible colors represented therein will be hereinafter referred to as color space.

Applying image manipulation and correction such as retouching results in a color change, causing the position of a color to move from a given point in a color space to another point in the color space. An interest region is extracted by calculating the amount of this movement, which represents the distance that the position of a color has moved in the color space (amount of color change). The amount of color change is given by Equation (1) below.

$$S_i = \sqrt{(R'_i - R_i)^2 + (G'_i - G_i)^2 + (B'_i + B_i)^2} \quad (1)$$

In Equation (1) above, i is a number for identifying a pixel in image data, and $S_i$ is the amount of color change of the i-th pixel. Further, $R_i$ is the pre-processing red pixel value of the i-th pixel, $R'_i$ is the post-processing red pixel value of the i-th pixel, $G_i$ is the pre-processing green pixel value of the i-th pixel, and $G'_i$ is the post-processing green pixel value of the i-th pixel. Further, $B_i$ is the pre-processing blue pixel value of the i-th pixel, and $B'_i$ is the post-processing blue pixel value of the i-th pixel. Thus, the amount of color change according to the first exemplary embodiment is defined as the amount of change in distance in a color space between pre-processing image data and post-processing image data. In the foregoing description of the first exemplary embodiment, the amount of movement in a color space of each of the three primary colors is calculated. However, this is not to be construed restrictively. For example, an interest region may be extracted by calculating the amount of movement in the Lab color space that uses pixel values and chroma. In the foregoing description of the first exemplary embodiment, the amount of color change is defined as the amount of movement in a color space. However, this is not to be construed restrictively. For example, the amount of color change nay be the amount of change in pixel value of each primary color between pre-processing image data and post-processing image data.

The following describes, with reference to FIG. 4, the information processing apparatus 10 that displays an interest region. FIG. 4 is a schematic illustration of an example of screens displayed by the information processing apparatus 10, which is used to explain extraction of an interest region according to the first exemplary embodiment.

As illustrated in FIG. 4, the information processing apparatus 10 includes an image data display screen 40, and an interest-region display screen 41. The information processing apparatus 10 uses a rectangle 42 to enclose a region displayed in the image data display screen 40 where the amount of color change is greater than in other areas, extracts the enclosed region as an interest region, and displays the extracted interest region on the interest-region display screen 41. A region with a greater amount of color change than other areas refers to a region within image data where a marked color change has occurred as a result of retouching or other processing. The following description is directed to a case in which the interest region according to the first exemplary embodiment is a region with a large amount of color change. However, this is not to be construed restrictively. In one example, an area with an amount of color change greater than a predetermined threshold may be defined as interest region. In another example, the mean amount of color change is calculated for each area, and an area with a large mean amount of color change may be defined as interest region.

For example, as illustrated in FIG. 4, if plural interest regions exist, the information processing apparatus 10 uses plural rectangles 42 to enclose the plural interest regions displayed on the image data display screen 40, and extracts the enclosed interest regions. At this time, the information processing apparatus 10 extracts each rectangle 42 as an interest region onto the interest-region display screen 41, and displays the extracted rectangle 42 on each of a first interest-region screen 43 and a second interest-region screen 44.

The following describes, with reference to FIG. 5, the information processing apparatus 10 that extracts a single region including plural extracted interest regions, and displays the single extracted region on the interest-region display screen 41. FIG. 5 is a schematic illustration of an example of screens displayed by the information processing apparatus 10, which is used to explain extraction of a single region including plural interest regions according to the first exemplary embodiment.

As illustrated in FIG. 5, the information processing apparatus 10 includes the image data display screen 40, and the interest-region display screen 41. The information processing apparatus 10 uses a single rectangle 45 to enclose plural interest regions displayed on the image data display screen 40, extracts the enclosed interest regions, and displays the extracted interest regions on the interest-region display screen 41. The information processing apparatus 10 displays, as information indicative of each interest region displayed on the interest-region display screen 41, a word bubble 46 in each area where an interest region is displayed.

In the foregoing description of the first exemplary embodiment, an interest region displayed on the image data display screen 40 is highlighted by enclosing the interest region in the rectangle 42 or the rectangle 45. However, this is not to be construed restrictively. An interest region may be highlighted by enclosing the interest region in a circle, or by changing its color tone to distinguish the interest region from other, non-interest regions. In the foregoing description of the first exemplary embodiment, the word bubble 46 is displayed as information indicative of an interest region. However, this is not to be construed restrictively. Alternatively, an interest region may be highlighted by enclosing the interest region in a rectangle or circle.

As described above, in the first exemplary embodiment, if plural interest regions exist, the user selects whether to display the interest regions on plural corresponding screens as illustrated in FIG. 4, or display the interest regions on a single screen as illustrated in FIG. 5. However, this is not to be construed restrictively. Whether to display plural interest regions on plural corresponding screens may be determined based on the distance between the interest regions. More specifically, if a single region that covers plural interest regions is to be displayed as illustrated in FIG. 5, the greater the distance between the interest regions, the larger the resulting single region, and the harder it is for the user to find each one of the interest regions. Accordingly, if the distance between plural interest regions is greater than a threshold, each interest region is displayed on the corresponding one of plural interest-region screens as illustrated in FIG. 4, and if the distance between plural interest regions is less than or equal to the threshold, a single region that covers these interest regions is displayed as illustrated in FIG. 5.

Alternatively, in displaying plural interest regions within a single region, if the size of the resulting region is greater than a threshold, each interest region may be displayed on the corresponding one of plural interest-region screens as illustrated in FIG. 4, and if the size of the resulting region is less than or equal to the threshold, a single region that covers these interest regions may be displayed as illustrated in FIG. 5.

Figure 6:
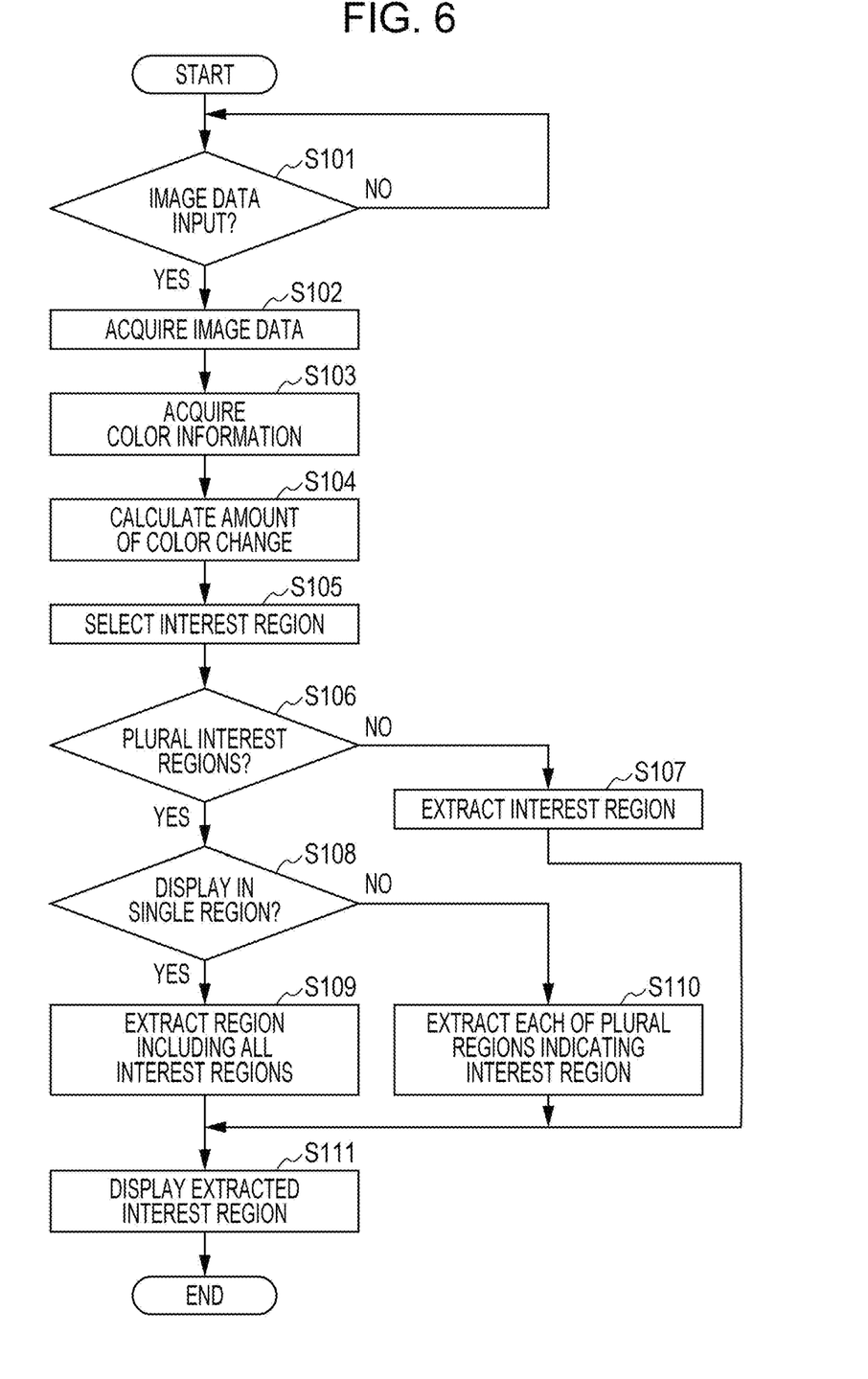
FIG. 6 is a flowchart illustrating an example of information processing according to the first exemplary embodiment.

The following describes, with reference to FIG. 6, operation of an information processing program according to the first exemplary embodiment. FIG. 6 is a flowchart illustrating an example of information processing according to the first exemplary embodiment. The information processing in FIG. 6 is executed by the CPU 11 reading and executing the information processing program from the ROM 12 or the storage 14. The information processing illustrated in FIG. 6 is executed when, for example, the user instructs that the information processing program be executed.

At step S101, the CPU 11 determines whether image data has been input. If image data has been input (step S101: YES), the CPU 11 proceeds to step S102. If no image data has been input (step S101: NO), the CPU 11 waits until image data is input.

At step S102, the CPU 11 acquires the input image data that has not undergone color correction, and image data that has undergone color correction. At this time, the CPU 11 acquires a user's selection of whether to display the image data on plural screens, which is input by the user together with the input of the image data.

At step S103, the CPU 11 acquires color information, which represents the pixel values of individual primary colors in a color space for each pixel in the input image data. The pixel values of individual primary colors in image data will be hereinafter referred to as color information.

At step S104, the CPU 11 calculates the amount of color change by comparing the color information of the image data that has not undergone color correction, with the color information of the image data that has undergone color correction.

At step S105, the CPU 11 selects an interest region by using the amount of color change. For example, the amounts of color change of individual pixels in the image data are compared to extract pixels with greater amounts of color change than other pixels, and a region where such pixels with greater amounts of color change are concentrated is selected as an interest region. If plural interest regions exist, such interest regions may be subjected to further selections. For example, the top three regions with the greatest amount of color change may be further selected as interest regions from plural interest regions.

At step S106, the CPU 11 deter nines whether plural interest regions exist. If plural interest regions exist (step S106: YES), the CPU 11 proceeds to step S108. If plural interest regions do not exist (S106: NO), the CPU 11 proceeds to step S107.

At step S107, the CPU 11 extracts an interest region.

At step S108, the CPU 11 deter nines whether to display the plural interest regions as a single interest region. If the plural interest regions are to be displayed as a single interest region (step S108: YES), the CPU 11 proceeds to step S109. If plural interest regions are not to be displayed as a single interest region (step S108: NO), the CPU 11 proceeds to step S110.

At step S109, the CPU 11 extracts a region that covers all interest regions.

A step S110, the CPU 11 extracts each region representing each corresponding interest region.

At step S111, the CPU 11 displays the extracted interest region on the interest-region display screen 41.

As described above, according to the first exemplary embodiment, an area with a greater amount of color change than other areas is extracted. Therefore, for an image that has undergone color correction, an area with a comparatively great amount of color change may be displayed as an interest region.

Second Exemplary Embodiment

The foregoing description of the first exemplary embodiment is directed to the case in which the amounts of color change of individual pixels in image data are compared. The following description of a second exemplary embodiment is directed to a case in which image data is segmented into segment regions, and the amounts of color change of individual segment regions are compared. A block diagram illustrating the hardware configuration of the information processing apparatus 10 according to the second exemplary embodiment (see FIG. 1), a block diagram illustrating the functional configuration of the information processing apparatus 10 according to the second exemplary embodiment (see FIG. 2), and a schematic illustration of pre-processing image data and post-processing image data according to the second exemplary embodiment (see FIG. 3) are similar to those in the first exemplary embodiment, and thus will not be described in further detail.

Figure 7:
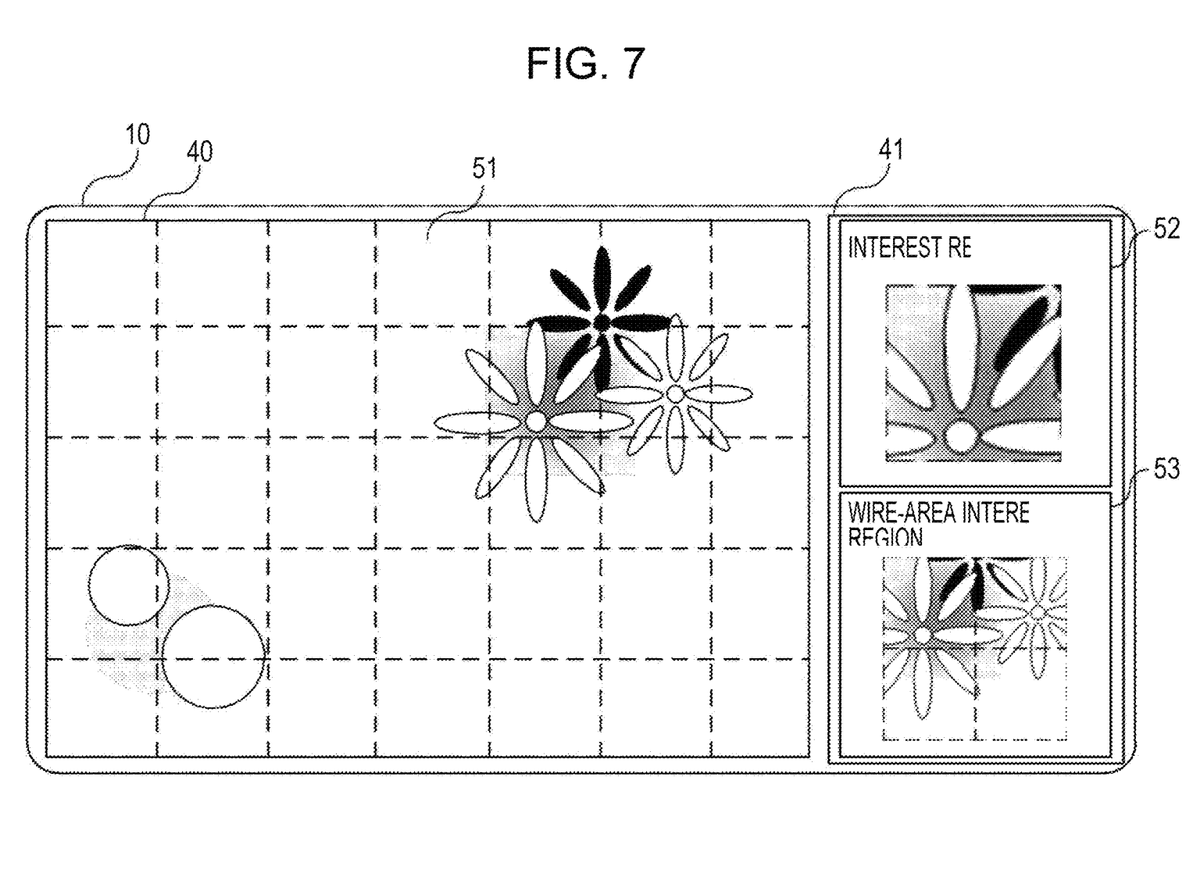
FIG. 7 is a schematic illustration of an example of screens displayed by an information processing apparatus, which is used to explain extraction of an interest region according to a second exemplary embodiment.

The following describes, with reference to FIG. 7, the information processing apparatus 10 that displays an interest region extracted from regions obtained by segmenting image data equally. FIG. 7 is a schematic illustration of an example of screens displayed by the information processing apparatus 10, which is used to explain extraction of an interest region according to the second exemplary embodiment. Features in FIG. 7 identical to those of the image data display screen 40 illustrated in FIG. 4 will be designated by the same reference signs as those in FIG. 4 and will not be described in further detail.

As illustrated in FIG. 7, the information processing apparatus 10 includes the image data display screen 40, and the interest-region display screen 41. The image data display screen 40 displays regions (to be referred to as "equal-segment regions") 51 into which image data is segmented equally. The interest-region display screen 41 includes an interest-region screen 52, which displays an equal-segment region 51 with the greatest amount of color change, and a wide-area interest-region screen 53, which displays the entirety of an interest region.

The information processing apparatus 10 segments image data displayed on the image data display screen 40 equally into plural equal-segment regions 51, and calculates the amount of color change for each equal-segment region 51. The amount of color change is given by Equation 2 below.

$$S_i = \sum_{i=0}^{n} \sqrt{(R'_i - R_i)^2 + (G'_i - G_i)^2 + (B'_i - B_i)^2} \qquad (2)$$

In Equation (2) above, n is the number of pixels included in each segment region. Thus, the amount of color change according to the second exemplary embodiment is defined as the sum of the amounts of change in distance in a color space for each individual segment region between pre-processing image data and post-processing image data.

As illustrated in FIG. 7, the information processing apparatus 10 calculates the amount of color change for each equal-segment region 51, extracts an equal-segment region 51 with a greater amount of color change than other equal-segment regions 51, and enlarges the extracted equal-segment region 51 for display on the interest-region screen 52 of the interest-region display screen 41. Tor example, the information processing apparatus 10 extracts an equal-segment region with the greatest amount of color change, and displays the extracted equal-segment region on the interest-region screen 52 of the interest-region display screen 41. Further, if the information processing apparatus 10 extracts a region with a large amount of color change, and the extracted region with a large amount of color change extends over plural equal-segment regions, the information processing apparatus 10 extracts these equal-segment regions over which the region with a large amount of color change extends, and displays the extracted equal-segment regions on the wide-area interest-region screen 53 of the interest-region display screen 41. The foregoing description is directed to the case in which the interest region according to the second exemplary embodiment is the segment region with the greatest amount of color change. However, this is not to be construed restrictively. Plural segment regions with amounts of color change exceeding a predetermined threshold may be extracted as interest regions.

Figure 8:
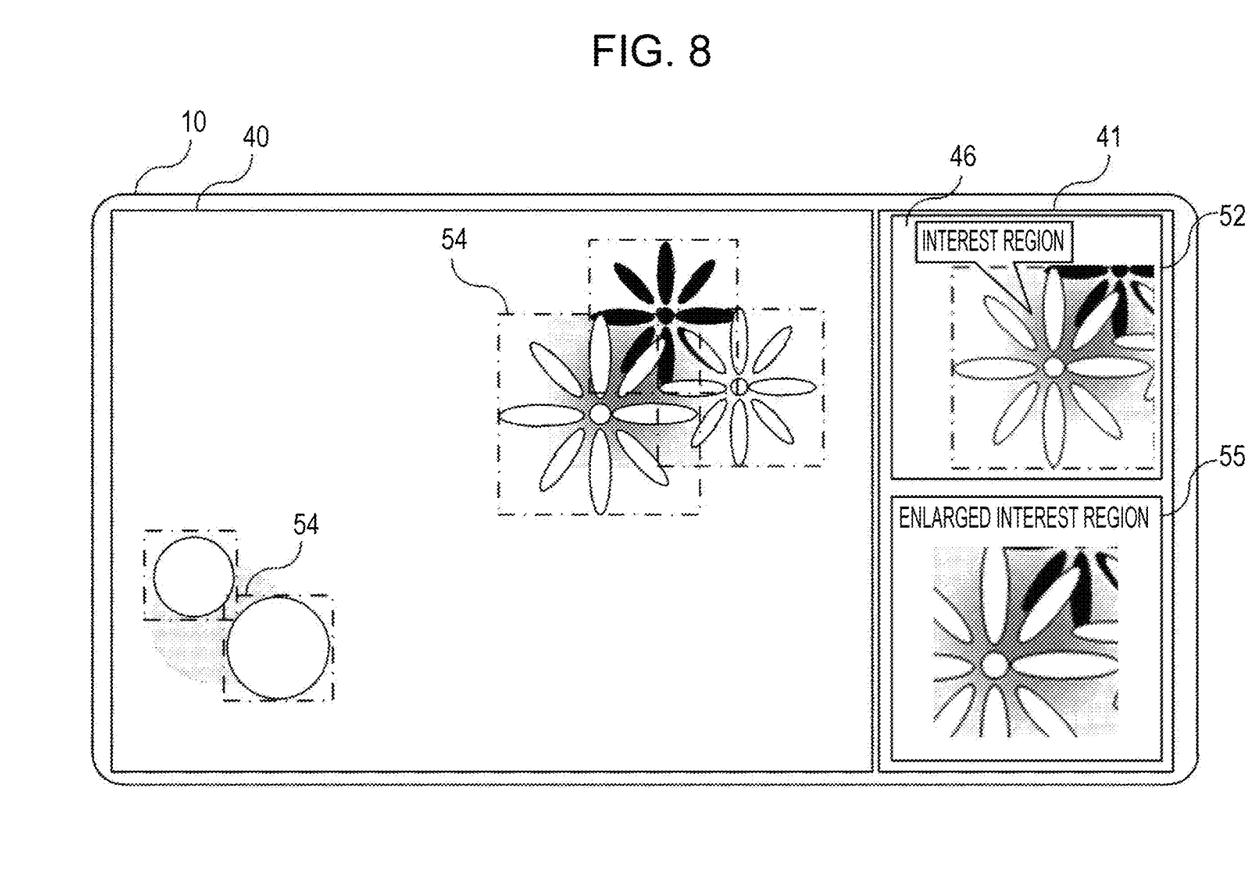
FIG. 8 is a schematic illustration of an example of screens displayed by an information processing apparatus, which is used to explain extraction of an interest region according to the second exemplary embodiment.

The following describes, with reference to FIG. 8, the information processing apparatus 10 that displays an interest region extracted from regions obtained by segmenting image data for each object. FIG. 8 is a schematic illustration of an example of screens displayed by the information processing apparatus, which is used to explain extraction of an interest region according to the second exemplary embodiment. Features in FIG. 8 identical to those of the image data display screen 40 illustrated in each of FIGS. 4 and 7 will be designated by the sane reference signs as those in each of FIGS. 4 and 7 and will not be described in further detail.

As illustrated in FIG. 8, the information processing apparatus 10 includes the image data display screen 40, and the interest-region display screen 41. The information processing apparatus 10 displays, on the image data display screen 40, regions (to be referred to as "subject segment regions") 54 obtained by segmenting image data for each subject included in the image data. The information processing apparatus 10 extracts, onto the interest-region display screen 41, a subject segment region 54 with the greatest amount of color change, enlarges the extracted subject segment region 54, and displays the enlarged subject segment region 54 on an enlarged interest-region screen 55, which shows a region that has undergone a marked color change. The information processing apparatus 10 displays the word bubble 46 at a location where an interest region is displayed on the interest-region display screen 41, as information indicative of an area corresponding to the displayed interest region.

For example, the information processing apparatus 10 extracts a subject segment region 54 with the greatest amount of color change, and displays the extracted subject segment region 54 on the interest-region screen 52. If a region with a large amount of color change fits inside the subject segment region 54, the information processing apparatus 10 enlarges the region with a large amount of color change, and displays the enlarged region on the enlarged interest-region screen 55. Further, the information processing apparatus 10 attaches the word bubble 46 for the interest region displayed on the interest-region screen 52.

Figure 9:
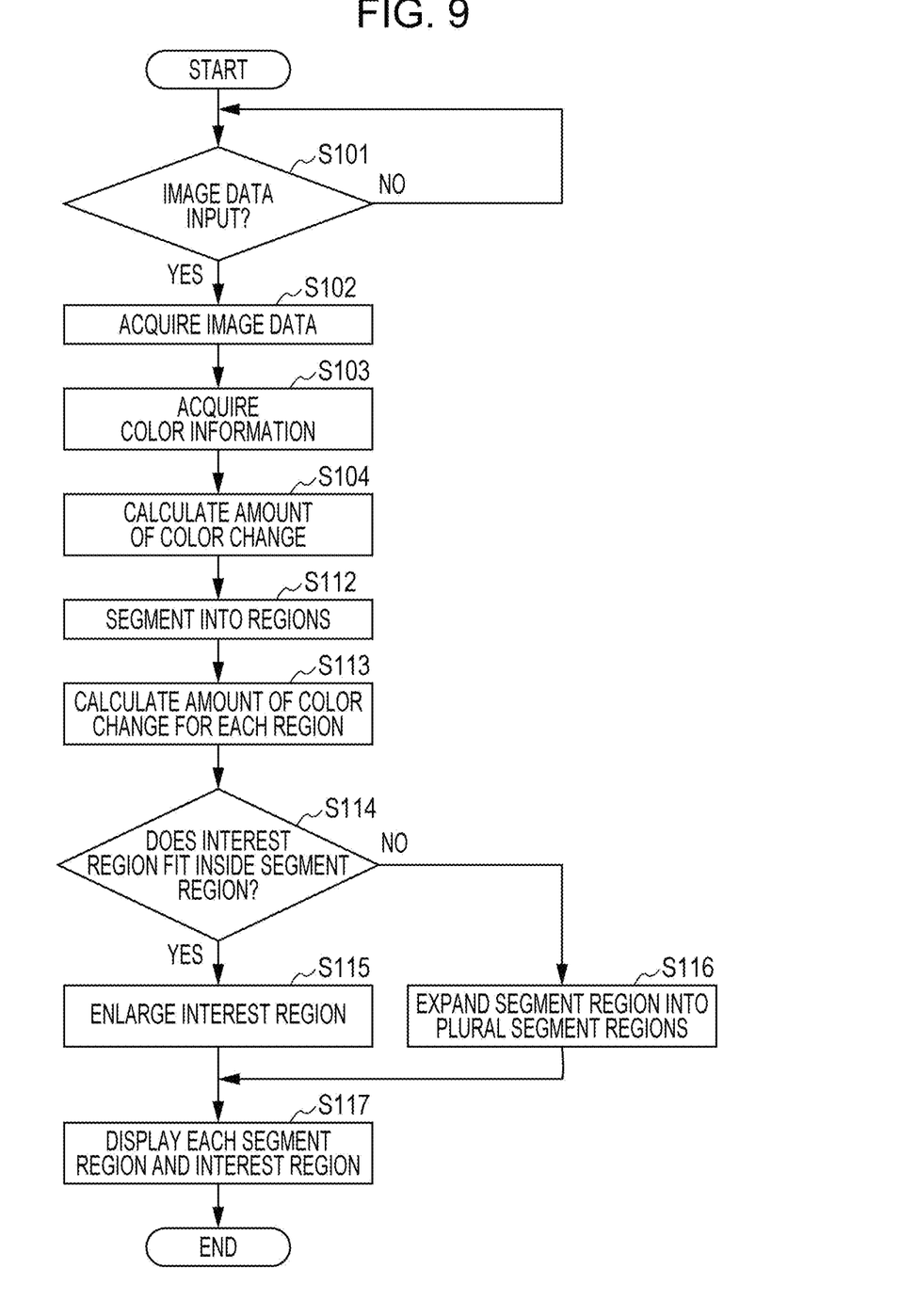
FIG. 9 is a flowchart illustrating an example of information processing according to the second exemplary embodiment.

The following describes, with reference to FIG. 9, operation of the information processing program according to the second exemplary embodiment. FIG. 9 is a flowchart illustrating an example of information processing according to the second exemplary embodiment. The information processing in FIG. 9 is executed by the CPU 11 reading and executing the information processing program f rom the ROM 12 or the storage 14. The information processing illustrated in FIG. 9 is executed when, for example, the user instructs that the information processing program be executed. Steps in FIG. 9 identical to those of the information processing illustrated in FIG. 6 will be designated by the same reference signs as those in FIG. 6 and will not be described in further detail.

At step S112, the CPU 11 segments image data equally or for each subject. The selection of whether to segment image data equally or for each subject is input by the user together with the input of the image data.

At step S113, the CPU 11 calculates the amount of color change for each segment region.

At step S114, the CPU 11 determines whether an interest region fits inside a segment region with the greatest amount of color change. If the interest region fits inside such a segment region (step S114: YES), the CPU 11 proceeds to step S115. If the interest region does not fit inside such a segment region (step S114: NO), the CPU 11 proceeds to step S116.

At step S115, the CPU 11 extracts the segment region, and enlarges the interest region that fits inside the extracted segment region.

At step S116, the CPU 11 expands the segment region into plural segment regions over which the interest region extends, and extracts each of these segment regions.

At step S117, the CPU 11 displays the extracted segment region and the interest region.

As described above, according to the second exemplary embodiment, image data is segmented into segment regions, and the amount of color change is calculated for each segment region, thus facilitating extraction of an interest region.

The configuration of the information processing apparatus 10 described above with reference to the exemplary embodiments is only an illustrative example, and may be modified according to the circumstances without departing from the scope of the present disclosure.

The procedure for the processing executed by the program described above with reference to the above-mentioned exemplary embodiments is also only illustrative. Unnecessary steps may be removed, new steps may be added, or the order of processing may be changed, without departing from the scope of the present disclosure.

In the embodiments above, the term "processor" refers to hardware in a broad sense. Examples of the processor includes general processors (e.g., CPU: Central Processing Unit), and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not United to one described in the embodiments above, and may be changed.

Although the foregoing description of the exemplary embodiments above is directed to the case in which the program for processing information is pre-stored (pre-installed) in the storage 14, this is not to be construed restrictively. The program may be provided while being stored in a storage medium examples of which include a compact disc read only memory (CD-ROM, a digital versatile disc read only memory (DVD-ROM, and a universal serial bus (USB) memory. The program may be downloaded from an external device via a network.

The foregoing description of the exemplary embodiments of the present disclosure has been provided for the purposes of illustration and description. It is not intended to be exhaustive or to limit the disclosure to the precise form disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claim and their equivalents.

What is claimed is:

1. An information processing apparatus comprising a processor configured to:
   acquire first image data and second image data, the second image data being image data obtained by correcting a color of the first image data;
   acquire an amount of color change between the first image data and the second image data for each area within the acquired image data;
   extract an interest region from the acquired image data, the interest region being an area in the acquired image data where the amount of color change is greater than in other areas; and
   control to display the extracted interest region.

2. The information processing apparatus according to claim 1,
   wherein when the interest region in the acquired image data comprises a plurality of interest regions, the processor performs at least one of extracting a single region enlarged to include the plurality of interest regions, and extracting a plurality of regions each including the interest region.

3. The information processing apparatus according to claim 2,
   wherein when the processor extracts the single region enlarged to include the plurality of interest regions, the processor displays information indicating a part of the extracted region corresponding to each of the plurality of interest regions.

4. The information processing apparatus according to claim 2,
   wherein the processor highlights the interest region.

5. The information processing apparatus according to claim 3,
   wherein the processor highlights the interest region.

6. The information processing apparatus according to claim 1,
   wherein the processor segments the acquired image data into a plurality of segment regions, extracts a segment region including the interest region from the plurality of segment regions, and displays the extracted segment region, the plurality of segment regions being obtained by segmenting the acquired image data equally or by segmenting the acquired image data for each subject included in the acquired image data.

7. The information processing apparatus according to claim 2,
   wherein the processor segments the acquired image data into a plurality of segment regions, extracts a segment region including the interest region from the plurality of segment regions, and displays the extracted segment region, the plurality of segment regions being obtained by segmenting the acquired image data equally or by segmenting the acquired image data for each subject included in the acquired image data.

8. The information processing apparatus according to claim 3,
   wherein the processor segments the acquired image data into a plurality of segment regions, extracts a segment region including the interest region from the plurality of segment regions, and displays the extracted segment region, the plurality of segment regions being obtained by segmenting the acquired image data equally or by segmenting the acquired image data for each subject included in the acquired image data.

9. The information processing apparatus according to claim 6,
   wherein in extracting the segment region including the interest region, the processor displays information indicating a part of the extracted segment region that corresponds to the interest region.

10. The information processing apparatus according to claim 7,
    wherein in extracting the segment region including the interest region, the processor displays information indicating a part of the extracted segment region that corresponds to the interest region.

11. The information processing apparatus according to claim 8,
    wherein in extracting the segment region including the interest region, the processor displays information indicating a part of the extracted segment region that corresponds to the interest region.

12. The information processing apparatus according to claim 9,
wherein the processor extracts, from the segment region, a region where the amount of color change is greatest.

13. The information processing apparatus according to claim 10,
wherein the processor extracts, from the segment region, a region where the amount of color change is greatest.

14. The information processing apparatus according to claim 11,
wherein the processor extracts, from the segment region, a region where the amount of color change is greatest.

15. The information processing apparatus according to claim 12,
wherein when the interest region is included within the segment region, the processor enlarges the interest region included within the segment region in the image data, and displays the enlarged interest region.

16. The information processing apparatus according to claim 13,
wherein when the interest region is included within the segment region, the processor enlarges the interest region included within the segment region in the image data, and displays the enlarged interest region.

17. The information processing apparatus according to claim 15,
wherein when the interest region is larger than the segment region, the processor enlarges the segment region to include the interest region, and extracts and displays the enlarged segment region.

18. The information processing apparatus according to claim 1,
wherein the processor acquires the amount of color change by using pre-processing image data and post-processing image data, the pre-processing image data being the image data that has not undergone processing, the post-processing image data being the image data that has undergone the processing.

19. The information processing apparatus according to claim 18,
wherein the amount of color change is a sum of amounts of change in distance in a color space between the pre-processing image data and the post-processing image data.

20. A non-transitory computer readable medium storing a program causing a computer to execute a process for processing information, the process comprising:
acquiring first image data and second image data, the second image data being image data obtained by correcting a color of the first image data;
acquiring an amount of color change between the first image data and the second image data for each area within the acquired image data;
extracting an interest region from the acquired image data, the interest region being an area in the acquired image data where the amount of color change is greater than in other areas; and
controlling to display the extracted interest region.

* * * * *